Jan. 22, 1929.

R. J. EVANS 1,700,037

BRAKE LINING

Filed Jan. 20, 1928   2 Sheets-Sheet 1

Inventor
R. J. Evans
by Wilkinson & Giusta
Attorneys.

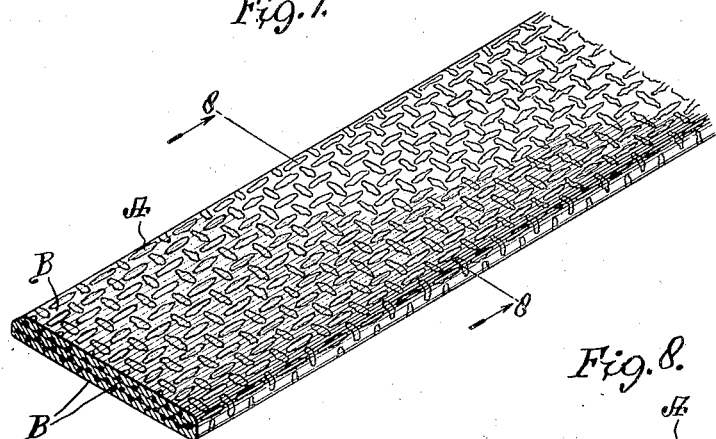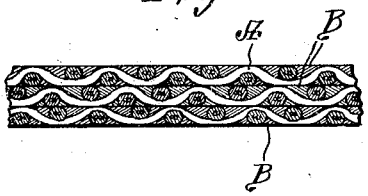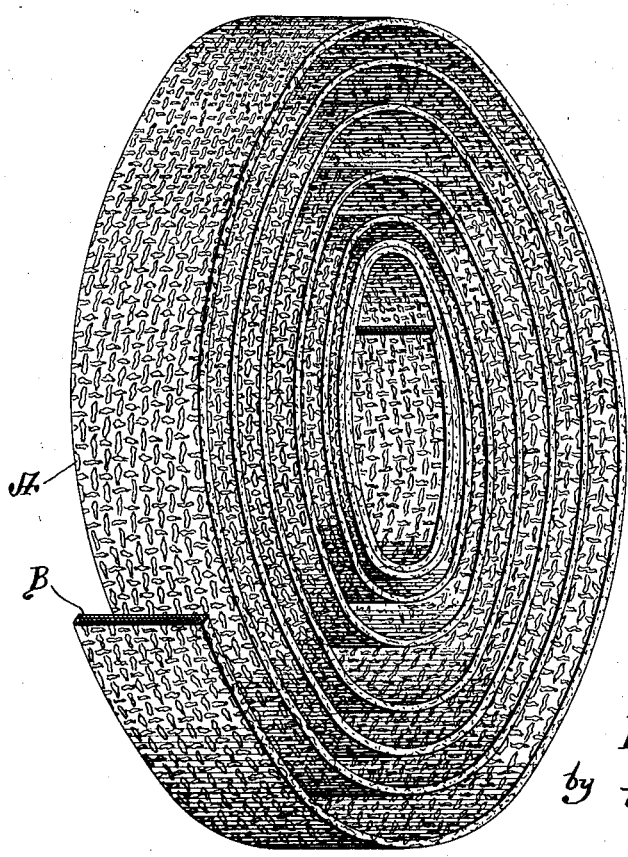

Patented Jan. 22, 1929.

1,700,037

UNITED STATES PATENT OFFICE.

RICHARD J. EVANS, OF HUNTINGTON, INDIANA, ASSIGNOR TO ASBESTOS MANUFACTURING COMPANY, OF HUNTINGTON, INDIANA, A CORPORATION OF INDIANA.

BRAKE LINING.

Application filed January 20, 1928. Serial No. 248,206.

My invention relates to an improved construction of brake lining for the friction brakes of automobiles, trucks, or the like vehicles, or for use in braking rotary drums or shafts of any kind where it is desired to secure quick and efficient adjustment of the brake, and in which the brake lining does not tend to stick to the drum when released and in which the wear takes place uniformly, as the engaging surface of the brake lining wears. In other words, my invention is intended to provide a brake lining having a high co-efficiency of friction and great durability under intense wear, uniformity of friction resistance substantially unaffected by moisture and temperature conditions, and which does not stick when the brake lever is released.

My invention will be more clearly understood after reference to the accompanying drawings in which like parts are indicated by similar reference symbols throughout the several views, and in which Figure 1 shows a strand of asbestos fiber twisted comparatively tightly, but without the addition of any other material.

Figure 7 shows a strip of brake band composed of several layers of fabric superposed and joined together, as will be hereinafter described.

Figure 8 shows a section along the line 8—8 of Figure 7, looking in the direction of the arrows, the parts being shown on a larger scale.

Figure 9 shows a roll of the brake band lining ready for shipment, which should be cut into strips of the desired length when used.

Figure 1:
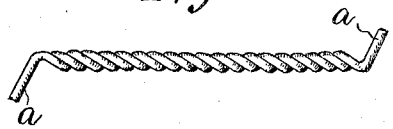

In the manufacture of my improved brake lining, first I twist the fibers of asbestos as secured from the rock into special hard multiple yarns $a$, as shown in Figure 1.

Figure 2:
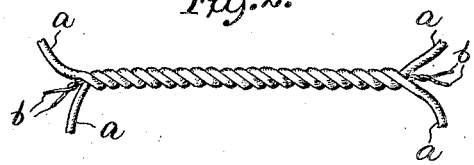
Figure 2 shows two strands of asbestos of Figure 1 having combined therewith strands of fine flexible wire.
Figure 3:
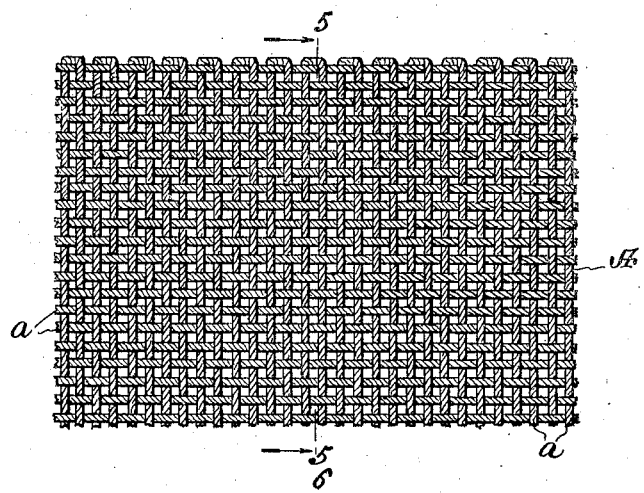
Figure 3 shows a woven fabric made of the strands of Figure 2, which are permeated before weaving with a fireproof liquid such as silicate of soda, the warp threads and the woof threads being of equal strength and crossing each other at equal intervals so as to give equal strength to the material in either transverse or longitudinal direction.

Then I twist up with one or more of these asbestos yarns one or more strands of fine wire $b$, for example, .008 brass wires, the product being a cord of twisted yarn and wire, as shown in Figure 2. These cords are then treated with the permeating fire-proof liquid solution containing silicate of soda (water glass), and after such treatment and partial drying, these yarns are woven into an open mesh or fabric A, as shown in Figure 3. The weaving is of the ordinary basket weave, and the woof threads are preferably of the same strength and distance apart as are the warp threads, so that the fabric is of substantially the same strength transversely and longitudinally.

Figure 4:
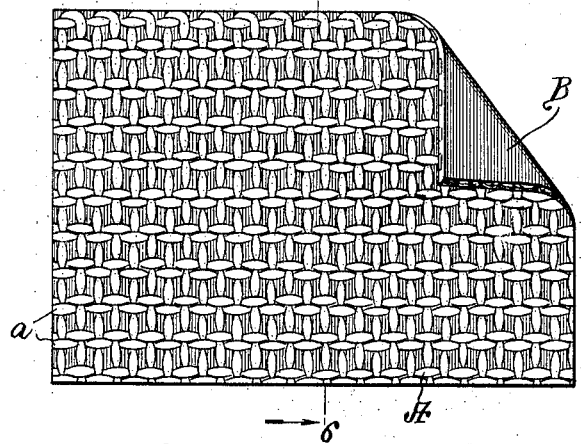
Figure 4 shows the fabric of Figure 3 after it has been thoroughly dried, and after it has been coated on one side with a mineral friction compound composed of rubber and other material, as will be hereinafter described.
Figure 5:
Figure 5 shows a cross section of Figure 3 along the line 5—5 of said figure.

After the fabric has been so formed, it is treated and thoroughly dried so as to harden the fireproof liquid solution, causing the silicate to cement the asbestos fibers together, thus producing a hardened woven fire-proof fabric. This fabric, shown at A in Figure 3, is then treated on one side only as at B in Figure 4 with a mineral friction compound, which consists of rubber, litharge, and other ingredients, such as barytes, asbestine, sulphur, in a warm or plastic state, and the strip, so treated on one side, is subjected to high pressure, so as to force this plastic material from the back to the front of the fabric filling interstices between the cords, but leaving the wear surface of the strip not covered over with this plastic material.

Figure 6:
Figure 6 shows a cross section of Figure 4 along the line 6—6 and looking in the direction of the arrows.

A series of strips, such as shown in Figure 6, are then folded over or superposed as shown in Figures 7 and 8, where I show three of such strips, but two or more may be used if desired. In superposing these strips, the coated side B of each strip is adjacent to the uncoated side A of the adjacent strip, as shown most clearly in Figure 8. This is important because in the former practice of making brake bands it has been generally customary to coat both sides of each strip before these strips are superposed with the result that there is a doubling of the coating at the adjoining surfaces of the adjacent strips; whereas by coating each strip on one side only, a substantially uniform coating of rubber material will permeate the entire mass.

As the brake band wears down, there will be very little variation in the nature of the friction surface exposed to the drum.

After the strips are superposed, as just mentioned, to form the lining for a brake band, they are subjected to high pressure and sufficient heat to cure or vulcanize the rubber to the desired extent, so that the strips will not only adhere to form a substantially homogeneous band, but the material contained in the rubber will be properly held therein.

After being prepared as above described, the lining may be treated with a solution of fire and water proofing material composed of suitable oxidizing oils, China wood, or rosin oils, or other similar liquids, which will be converted into carbon under heat, and, after being so treated, the lining is again heated or baked at a high temperature for a sufficient period, five hours, more or less, for a final treatment.

After such treatment, the product is an aged or cured brake lining, and is better able to withstand wear and heat.

A strip of the finished brake lining band is shown in Figure 7, and Figure 8 shows an enlarged section of the same, while Figure 9 shows a long strip of the brake lining made up into a roll ready to be shipped to the consumer, suitable lengths of the brake lining being cut from the roll as desired.

In use, the coated part B of the strips of brake lining should be preferably furthest from the engaging surface of the brake drum. By this construction, there will be little or no tendency of the rubber to flow and stick on the braking surface of the lining, as occurs where the rubber shim is applied to both surfaces of the strips before being assembled into the completed lining. If there is an excessive amount of rubber on this side, there will be a tendency for this to fuse and stick to the drum, preventing the brake lining from becoming disengaged promptly when the brake lever is released.

When the brake lining is first applied this shim coat of rubber causes the brake to grab when the same becomes heated and to give a very low co-efficient of friction when cold. The presence of this layer of rubber has been found so undesirable that many manufacturers have found it necessary to grind or burnish the lining to remove the outer coating of rubber. This grinding results in the removal of some of the desirable thickness of the lining. I have discovered that by applying the friction compound to one side only, which is done by heavy calenders and forcing the friction material into and just through the open mesh of the cloth, it results in the construction of a brake lining which runs uniform in construction all the way through the lining. It results in the production of a lining whose surface never changes materially no matter how much it is worn.

Having thus described my invention, what I claim and desire to secure by Letters Patent of the United States is:—

1. The method of manufacturing brake bands which consists of twisting up yarns of asbestos fiber, forming these yarns into cords including fine wire strands, treating these cords with a silicate of soda solution, weaving the cords so treated into a basket weave fabric having the warp threads and the woof threads spaced at equal distances apart to give equal longitudinal and transverse strength to the fabric, heating and drying the fabric, applying to one side only of the fabric so formed a coating of plastic rubber and friction material, then subjecting the strip so formed to heat and pressure to force the plastic material through the interstices in the fabric, superposing a plurality of strips so formed, with the coated side of each strip next the uncoated side of the adjacent strip, and subjecting the band so formed to pressure and heat to cure the rubber and form a homogeneous mass.

2. The method of manufacturing brake bands which consists of twisting up yarns of asbestos fiber, forming these yarns into cords including fine wire strands, treating these cords with a silicate of soda solution, weaving the cords so treated into a basket weave fabric having the warp threads and the woof threads spaced at equal distances apart to give equal longitudinal and transverse strength to the fabric, heating and drying the fabric, applying to one side only of the fabric so formed a coating of plastic rubber and friction material, then subjecting the strip so formed to heat and pressure to force the plastic material through the interstices in the fabric, superposing a plurality of strips so formed, with the coated side of each strip next the uncoated side of the adjacent strip, subjecting the band so formed to pressure and heat to cure the rubber and form a homogeneous mass, and finally treating the product with a fire and water proofing material and baking the same.

3. The method of manufacturing brake bands which consists of twisting up yarns of asbestos fiber, forming these yarns into cords including fine wire strands, treating these cords with a permeating fire-proof liquid solution, weaving the cords so treated into a woven fabric, heating and drying the fabric, applying to one side only of the fabric so formed a coating of plastic rubber and friction material, then subjecting the strip so formed to heat and pressure to force the plastic material through the interstices in the fabric, superposing a plurality of strips so formed, with the coated side of each strip next the uncoated side of the adjacent strip, and subjecting the band so formed to pressure and heat to cure the rubber and form a homogeneous mass.

4. The method of manufacturing brake bands which consists of twisting up yarns of asbestos fiber, forming these yarns into cords including fine wire strands, treating these cords with a permeating fire-proof liquid, weaving the cords so treated into a woven fabric, heating and drying the fabric, applying to one side only of the fabric so formed a coating of plastic rubber and friction material, then subjecting the strip so formed to heat and pressure to force the plastic material through the interstices in the fabric, superposing a plurality of strips so formed, with the coated side of each strip next the uncoated side of the adjacent strip, subjecting the band so formed to pressure and heat to cure the rubber and form a homogeneous mass, and finally treating the product with a fire and water proofing material and baking the same.

5. The method of manufacturing brake bands which consists of twisting up yarns of asbestos fiber, forming these yarns into cords including fine wire strands, treating these cords with a silicate of soda solution, weaving the cords so treated into a woven fabric, heating and drying the fabric, applying to one side only of the fabric so formed a coating of plastic rubber and friction material, then subjecting the strip so formed to heat and pressure to force the plastic material through the interstices in the fabric, superposing a plurality of strips so formed, with the coated side of each strip next the uncoated side of the adjacent strip, and subjecting the band so formed to pressure and heat to cure the rubber and form a homogeneous mass.

6. The method of manufacturing brake bands which consists of twisting up yarns of asbestos fiber, forming these yarns into cords including fine wire strands, treating these cords with a silicate of soda solution, weaving the cords so treated into a woven fabric, heating and drying the fabric, applying to one side only of the fabric so formed a coating of of plastic rubber and friction material, then subjecting the strip so formed to heat and pressure to force the plastic material through the interstices in the fabric, superposing a plurality of strips so formed, with the coated side of each strip next the uncoated side of the adjacent strip, and subjecting the band so formed to pressure and heat to cure the rubber and form a homogeneous mass, and finally treating the product with a fire and water proofing material and baking the same.

RICHARD J. EVANS.